United States Patent [19]

Kamada et al.

[11] Patent Number: 5,206,744
[45] Date of Patent: Apr. 27, 1993

[54] DOCUMENT SCANNING APPARATUS HAVING IMAGE SIGNAL CORRECTING CAPABILITY

[75] Inventors: Takeshi Kamada, Atusgi; Masato Nakajima, Yokohama, both of Japan

[73] Assignee: Ricoh Company, Ltd., Tokyo, Japan

[21] Appl. No.: 707,893

[22] Filed: May 30, 1991

[30] Foreign Application Priority Data

May 31, 1990 [JP] Japan .................................. 2-140070

[51] Int. Cl.$^5$ ............................................. H04N 1/04
[52] U.S. Cl. .................................. 358/488; 358/486; 358/494; 358/496; 358/498
[58] Field of Search .............. 358/401, 405, 406, 412, 358/473, 474, 486, 487, 488, 494, 496, 498; 382/30, 33, 54, 59

[56] References Cited

U.S. PATENT DOCUMENTS 4,742,559 5/1988 Fujiwara et al. .................... 358/473

FOREIGN PATENT DOCUMENTS

62-166651A 7/1987 Japan .

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

A document scanning apparatus includes an image signal part for generating a number of successive image signals from a document which is transported along a transport path between a pair of feeding rollers and a pair of ejection rollers, a first detection part for detecting a position of the document in the transport path where a document transport is disordered when a front edge of the document being transported comes in contact with the ejection rollers, a second detection part for detecting a position of the document in the transport path where the document transport is disordered when a rear edge of the document being transported separates from the feeding rollers, and a signal correction part for correcting a defective image signal when at least one of the first detection part and the second detection part detects the position of the document where the document transport is disordered, the defective image signal being corrected through a prescribed signal correction which is carried out for a number of image signals adjacent to the defective image signal which are received from the image signal part.

10 Claims, 5 Drawing Sheets

DOCUMENT SCANNING APPARATUS HAVING IMAGE SIGNAL CORRECTING CAPABILITY

BACKGROUND OF THE INVENTION

The present invention generally relates to a document scanning apparatus, and more particularly to a document scanning apparatus having an image signal correcting function which may be applied to an image processing part of a facsimile or the like.

Conventionally, in a document scanning apparatus of a facsimile or the like, an optical unit has a scanning position where light is scanned over a document at a halfway portion of a document transport path between a pair of feeding rollers and a pair of ejection rollers for reading image data from the document. At this scanning position, light emitted from a light source in the optical unit is scanned over a surface of the document which is transported along the sheet transport path. One line of the image information in the document is scanned at a time by the optical unit in a main scanning direction, the document is transported a fixed distance along the sheet transport path by rotation of the feeding rollers and/or the ejection rollers.

Figure 1:
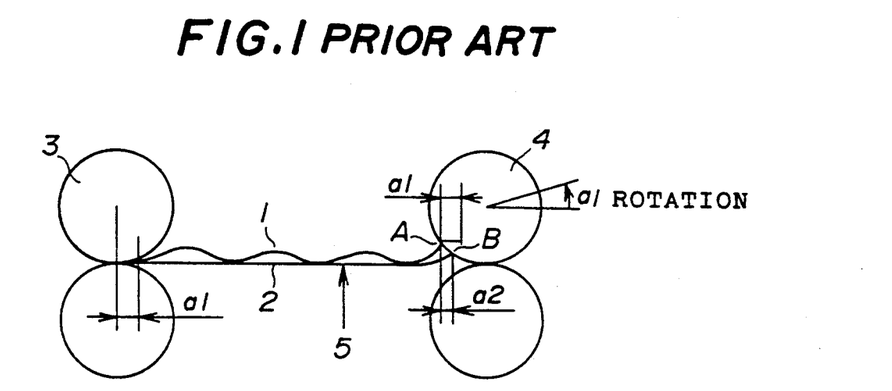
FIG. 1 is a schematic view showing an essential part of a prior document scanning apparatus when a deficiency of transport distance of a document along a transport path takes place.
Figure 2:
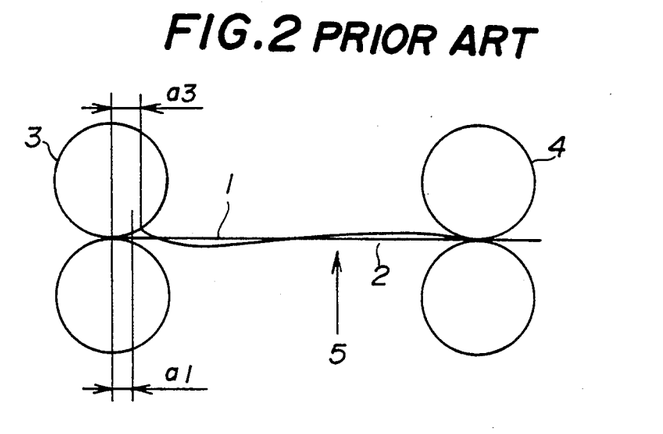
FIG. 2 is a schematic view showing the essential part of the prior document scanning apparatus when excessive document transport takes place in the transport path.

FIGS. 1 and 2 show an essential part of a prior document scanning apparatus. In the essential part of the document scanning apparatus shown in FIGS. 1 and 2, a document 1 is transported along a transport path 2 between a pair of feeding rollers 3 and a pair of ejection rollers 4. An optical scanning unit (not shown) has a scanning position 5 at a halfway position of the transport path 2 where a light beam emitted from a light source is scanned over a surface of the document 1 in a main scanning direction to read image information from the document 1 per each scan line.

For example, when a document 1 with an upwardly curled front edge portion is transported along the transport path 2, as shown in FIG. 1, the front edge of the document 1 comes unsuitably in contact with an upper roller of the ejection rollers 4 at a position indicated by "A" in FIG. 1. And, the document 1 is fed by the feeding rollers 3 as much as a given distance "a1" along the transport path, each time a scanning is made by the optical unit over the document 1 at the scanning position 5 in one scanning line in a main scanning direction. And, after one main scanning is made by the optical unit, the ejection rollers 4 are rotated as much as a given amount of rotation equivalent to the given transport distance a1 along the transport path. And, the front edge of the document 1 is moved to a position of the upper roller 4 as indicated by "B" in FIG. 1 and it is transported a distance "a2" along the transport path, which is slightly smaller than the proper transport distance "a1". Accordingly, the document 1 during transport has slack portions between the feeding rollers 3 and the ejection rollers 4, and the quantity x1 of transport of the document 1 at the scanning position 5 may be represented by a formula: $a2 \leq x1 \leq a1$. In this case, there is a problem in that the document 1 is deficient in the transport distance x1 at the scanning position 5, and a scanning of image information from the document 1 is not carried out with a proper transport distance of the document 1.

In FIG. 2, in order not to allow slack in the document 1 at the scanning position 5 in normal operation, a transport distance of the document 1 given by the ejection rollers 4 is slightly greater than a transport distance given by the feeding rollers 3 so that the document 1 in the transport path is kept under tension. And, the document 1 should be kept under tension along the transport path between the feeding rollers 3 and the ejection rollers 4 until the rear edge of the document 1 separates from the feeding rollers 3. However, once the rear edge of the document 1 separates from the feeding rollers 3, the document 1 returns back to its original condition, or a slack condition as illustrated in FIG. 2, due to the curling tendency of the document 1. As a result, the rear edge of the document 1 in this case is fed by the ejection rollers 4 as much as a transport distance "a3" along the transport path as shown in FIG. 2, which is slightly greater than the proper transport distance "a1", and the quantity "x2" of transport of the document 1 at the scanning position 5 may be represented by a formula: $a1 \leq x2 \leq a3$. In this case, there is a problem in that the transport distance of the document 1 at the scanning position 5 is excessive and a scanning of image information from the document 1 is not carried out with a proper transport distance.

Figures 3A, 3B:
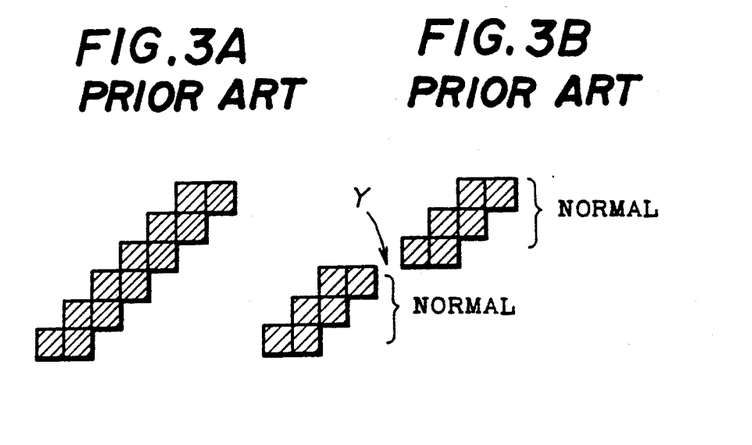
FIGS. 3A and 3B are diagrams showing output image data supplied by the prior document scanning apparatus in a case in which normal document transport is made and in a case in which excessive document transport is made, respectively.

FIG. 3A shows an example of pixels representing an inclined line reproduced from an original image, the pixels being normally outputted by the prior document scanning apparatus when a document is fed by a proper transport distance along the transport path. However, in the above described case in which an excessive transport distance along the transport path takes place as shown in FIG. 2, part of the reproduced image often lacks pixels when compared with the normally outputted pixels as shown in FIG. 3A, this lacking part being indicated by a letter "Y" in FIG. 3B, where a few pixels disappear due to the excessive transport distance. For this reason, the quality of reproduced images supplied by the prior document scanning apparatus deteriorates.

SUMMARY OF THE INVENTION

Accordingly, it is a general object of the present invention to provide an improved document scanning apparatus in which the above described problems of the prior document scanning apparatus are eliminated.

Another and more specific object of the present invention is to provide a document scanning apparatus which can prevent the quality of reproduced images from worsening owing to the the above described irregular transport of a document in a document transport path. The above mentioned object of the present invention can be achieved by a document scanning apparatus which comprises an image signal part for generating a number of successive image signals from image information read from a document which is transported along a transport path between a pair of feeding rollers and a pair of ejection rollers, a first detection part for detecting a position of the document in the transport path where the transport of the document in the transport path is disordered when a front edge of the document being transported comes in contact with the ejection rollers, a second detection part for detecting a position of the document in the transport path where the transport of the document in the transport path is disordered when a rear edge of the document being transported separates from the feeding rollers, and a signal correction part for correcting a defective image signal when at least one of the first and second detection parts detects the position of the document where the document transport is disordered, the defective image signal being corrected through a prescribed signal processing which is carried out for a number of image signals adjacent to the defective image signal which are received from the image signal part. According to the present invention, it is possible to correct a defective image signal due to the disordered document transport, through known signal processing of image signals adjacent to the defective image signal, the disordered document transport being detected at a given position in the transport path. Thus, it is possible to achieve good quality of reproduced images with corrected pixels.

Other objects and further features of the present invention will be more apparent from the following detailed description when read in conjunction with the accompanying drawings.

DESCRIPTION OF THE PREFERRED EMBODIMENT

Figure 4:
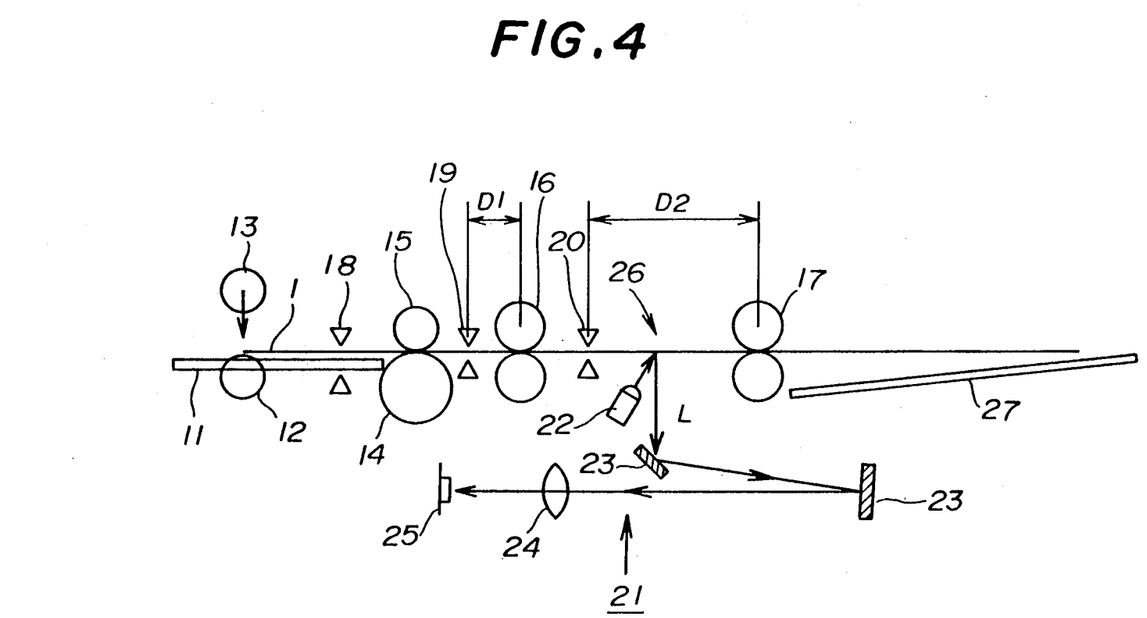
FIG. 4 is a schematic diagram showing an embodiment of a document scanning apparatus according to the present invention.

First, a description will be given of an embodiment of a document scanning apparatus according to the present invention, with reference to FIG. 4. In FIG. 4, there is illustrated a document scanning apparatus which generally has a document table 11 on which a document 1 is placed, a supplying roller 12, a pressure roller 13 opposed to the supplying roller 12, a paper feeding roller 14, a separation roller 15 coming in contact with the paper feeding roller 14, a pair of first feeding rollers 16 driven by a stepping motor (not shown), a pair of second feeding rollers 17 driven by a stepping motor (not shown), a document detection sensor 18 provided on the document table 11, a rear edge detection sensor 19 provided between the separation roller 15 and the first feeding rollers 16, a front/rear edge detection sensor 20 provided between the first feeding rollers 16 and the second feeding rollers 17, and a document scanning unit 21. This document scanning unit 21 comprises a light source 22 for emitting a light beam irradiating a document 1, a set of mirrors 23, a focusing lens 24, and photo-electric conversion elements 25 which are, for example, charge-coupled devices (CCDs). The document scanning unit 21 has a scanning position 26 which is located between the first feeding rollers 16 and the second feeding rollers 17. A stacker 27 is provided at a position behind the second feeding rollers 17, where a document ejected from the second feeding rollers 17 falls, and a plurality of documents one by one ejected from the second feeding rollers 17 may successively be placed on the stacker 27.

After the presence of a document 1 which is placed on the document table 11 is sensed by the document detection sensor 18, the pressure roller 13 is lowered toward the supplying roller 12 so that the document 1 is pressed between the pressure roller 13 and the supplying roller 12. As the supplying roller 12 is rotated, the document 1 is fed by the supplying roller 12 to the paper feeding roller 14. In a case in which a plurality of documents are set on the document table 11, the paper feeding roller 14 and the separation roller 15 have a function to separate one document from the others and transport the document one by one to the first feeding rollers 16. The document 1 is further fed by the first feeding rollers 16 toward the second feeding rollers 17. The front edge of the document 1 is detected by the front/rear edge sensor 20, and the document 1 is fed by the first feeding rollers 16 a prescribed distance from a position where the front edge thereof is detected by the sensor 20 so that the document 1 is set at the scanning position 26. The document 1 is scanned at the scanning position 26 by a light beam emitted from the light source 22. A reflected light L from the document 1 being scanned is reflected on the mirrors 23 and such a reflecteted light is focused by the focusing lens 24 on the photo-electric conversion elements (CCDs) 25. With such a reflected light L being received, image information from the document 1 is read by means of the CCDs 25, and an image signal indicative of the image data per one scan is outputted by the CCDs 25. Each time a light beam from the light source 22 of the document scanning unit 21 is scanned over the document 1 in one scanning line at the scanning position 26, the document 1 is transported by a given distance along the transport path between the feeding rollers 16 and the ejection rollers 17. After all the lines of image information from the document 1 are completely scanned, the document 1 is ejected by the ejection roller 17 out of the transport path to the stacker 27.

To determine a position within the transport path where excessive document transport takes place, as described above, it is necessary to detect the number of transport steps of the stepping motors for driving the feeding rollers 16, 17. The number of transport steps can be defined by the number of drive pulses being applied to the stepping motors for a time period from a time when the rear edge sensor 19 detects the rear edge of the document 1 in the transport path to a time when the rear edge of the document 1 transported separates from the first feeding rollers 16. The number of transport steps performed by the stepping motors correspond with a transport distance D1 as shown in FIG. 4, and this determination of a position where an excessive transport distance of a document takes place is made by a control part (not shown) of the document scanning apparatus. Similarly, to determine a position within the transport path where a deficiency in the transport distance of a document as described above with reference to FIG. 1, it is necessary to detect the number of transport steps of the stepping motors which can be defined by the number drive pulses being applied to the stepping motors for a time period from a time when the front/rear edge sensor 20 detects the front edge of the document 1 in the transport path to a time when the front edge of the transported document 1 reaches the second feeding rollers 17. The number of transport steps performed by the stepping motors correspond with a transport distance D2 as shown in FIG. 4, and this determination of a position where a deficient transport distance of a document takes place is made by the above control part.

Figure 5:
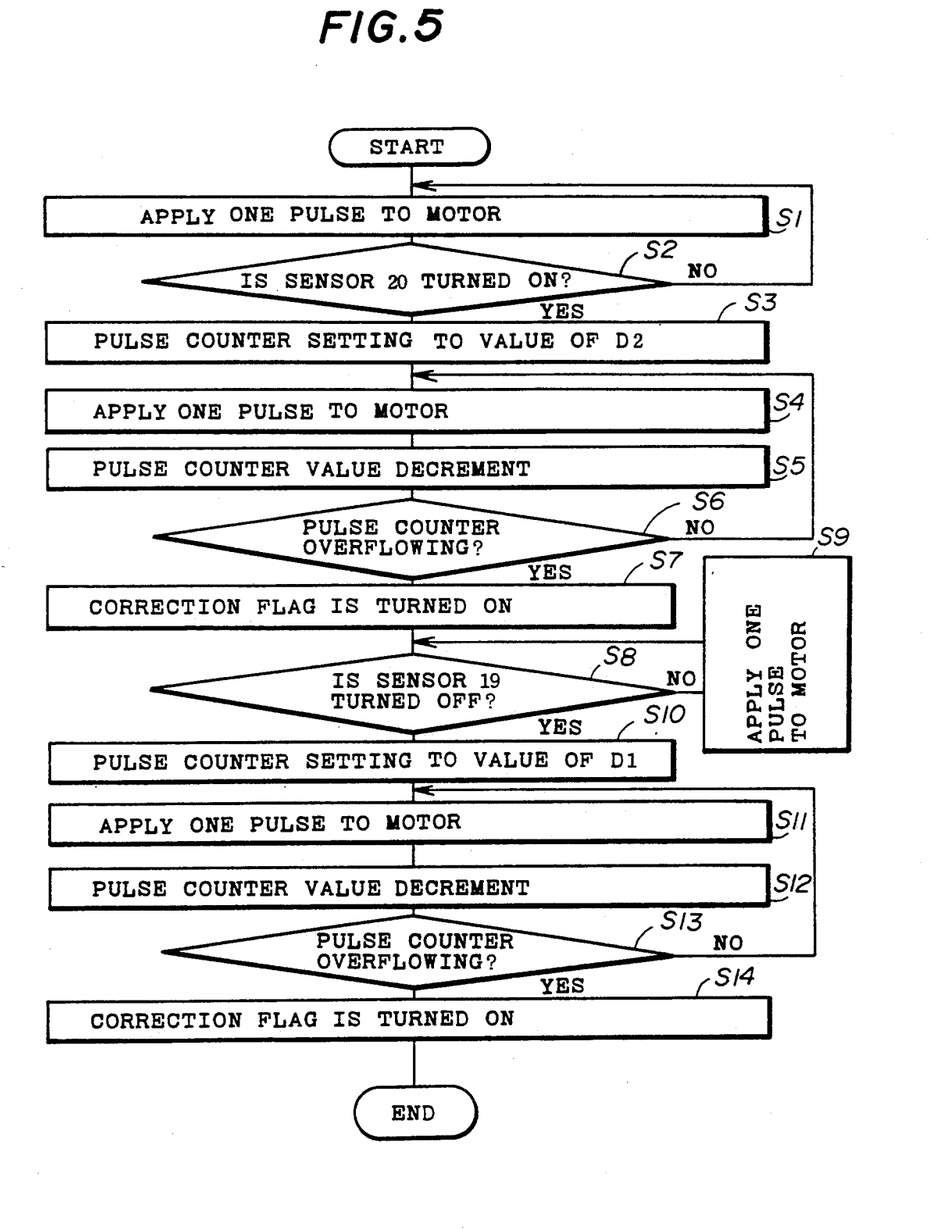
FIG. 5 is a flow chart for explaining a signal correction procedure which is carried out by the document scanning apparatus of the present invention.

Referring next to FIG. 5, a description will be given of a timing with which a signal correction procedure is carried out by the document scanning apparatus when a disorder of the transport of a document being transported along the transport path is detected, with reference to FIG. 5. A light beam from the light source is scanned by the document scanning unit 21 over the document 1 at the scanning position 26 is started. In a step S1 of a flow charge shown in FIG. 5, the ON/OFF state of the front/rear edge sensor 20 is monitored by the control part of the document scanning apparatus, while drive pulses are applied one by one to each of stepping motors provided for driving the first and second feeding rollers 16, 17. The first and second feeding rollers 16, 17 are rotated by a fixed amount per each drive pulse applied so that a document is transported along the transport path, the front edge of the document approaching the front/rear edge sensor 20. In a step S2, a determination is made as to whether the front/rear edge sensor 20 is turned ON by the front edge of the document 1. If the front/rear edge sensor 20 is turned ON, then, in a step S3, a value equivalent to the number of drive pulses required for the stepping motors to achieve the transport distance D2 of the document 1 described above is set in a pulse counter of the control part. After this step S3 is performed, each time one drive pulse is applied to the stepping motors and the stepping motors are run by a fixed amount in a step S4, the value (the number of drive pulses) stored in the pulse counter is repeatedly decremented until the front edge of the document 1 reaches the second feeding rollers 17 in a step S5. Next, in a step S6, a determination is made by the control part as to whether the value set in the pulse counter is equal to zero and the pulse counter has overflowed. If an overflowing of the pulse counter is detected, then a correction flag is turned ON in a step S7. This correction flag is a so-called soft flag which is provided in the control part. It is to be noted that a timing with which the correction flag is turned on accords with a timing with which a deficiency in feeding distance of the document 1 takes place. And, a signal correction procedure which will be described below is started in accordance with this timing with which the correction flag is turned ON.

In a step S8, a determination is made by the control part whether the rear edge of the document 1 is detected and the rear edge sensor 19 is turned OFF. If the read edge sensor 19 is still not turned OFF, then, in a step S9, drive pulses are applied one by one to the stepping motors so that the first and second feeding rollers are rotated to transport the document 1 by a fixed amount along the transport path. If the rear edge sensor 19 is turned OFF, then, in a step S10, a value equivalent to the number of drive pulses, required for the stepping motors to achieve the transport distance D1 of the document described above, is set to the pulse counter provided in the control part. After this step S10 is performed, each time a drive pulse is applied to each of the stepping motors and the feeding rollers 16, 17 are rotated by a fixed amount in a step S11, the value (the number of drive pulses) stored in the pulse counter is repeatedly decremented until the rear edge of the transported document separates from the first feeding rollers 16, 17 in a step S12. In a step S13, a determination is made by the control part whether the value set in the pulse counter is equal to zero and an overflowing of the pulse counter occurs. If an overflowing of the pulse counter is detected, then the correction flag is turned ON in a step S14. It is to be noted that this timing with which the correction flag is turned ON accords with a timing with which an excess in transport distance of the document 1 takes place. And, the signal correction procedure as described below is started in accordance with this timing immediately after the correction flag is turned ON.

Figure 6:
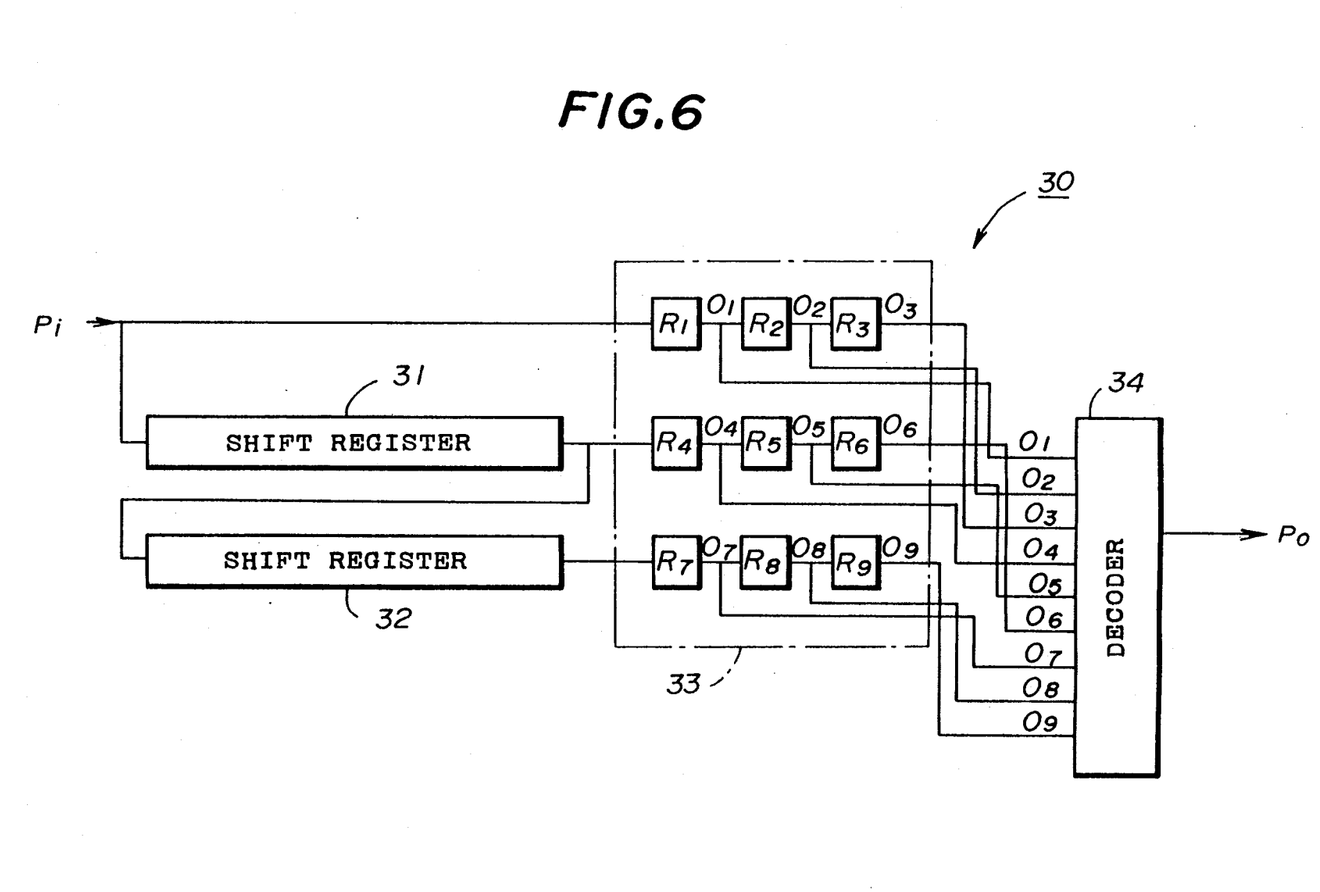
FIG. 6 is a block diagram showing a construction of a signal correction part of the document scanning apparatus of the present invention.

FIG. 6 shows a construction of a signal correction part 30 which makes a correction of a defective image signal due to the disordered document transport as described above. This signal correction procedure is a known anti-aliasing procedure for smoothing irregularities of image signals. This signal correction part 30 shown in FIG. 6 comprises a set of shift registers 31, 32 for storing image signals corresponding to one scanning line of a document along which a scanning of light is made by the document scanning unit, a register array 33 having nine registers R1 through R9 arranged in three rows by three columns for storing 3×3 pixel matrix patterns of pixels indicated by the image signals, and a decoder 34 to which a set of output data O1 through O9 are inputted by the nine registers R1 through R9 of the register array 33, respectively. In FIG. 6, a set of image signals Pi inputted to the signal correction part 30 are transferred to the register R1 and the shift register 31 for the pixels indicated by the image signals. Each image signal from the shift register 31 is supplied to both the register R4 and the shift register 32. In synchronism with when each image signal is transferred to the register R and the shift register 31, the shift registers 31 and 32 each carry out a right shifting in which an image data indicated by an image signal is shifted one position to the right. Thus, the image signals Pi are each outputted by the shift register 31 to both the register R4 and the shift register 32 after a delay of one scanning time, and each of the image signals Pi is further outputted by the shift register 32 to the register R7 after a delay of twice the scanning time. In addition, in synchronism with the transfer of each image signal Pi described above, each of the image signals inputted to the register R1 is succesively shifted to the register R2, adjacent to the register R1, and further shifted to the register R3 adjacent to the register R2. Similarly, the image signals supplied to the register R4 are each successively shifted to the adjacent register R5 and to the adjacent register R6, and the image signals supplied to the register R7 are each successively shifted to the adjacent register R8 and to the adjacent register R9. Therefore, a 3×3 pixel matrix pattern of pixels indicated by the image signals is produced from output signals 01 through 09 outputted respectively by the registers R1 through R9 of the register matrix 33.

The set of output signals 01 through 09 supplied from the registers R1 through R9 of the register array 33 are inputted to the decoder 34. The decoder 34 makes a comparison of the 3×3 pixel matrix pattern of pixels indicated by the output signals 01 through 09 with a predetermined mask pattern in accordance with the know anti-aliasing technique, so that a suitable conversion of image signals from black pixel into white pixel or vice versa is carried out. And, a set of output image data Po are finally outputted from the signal correction part 30 after the comparison with the predetermined mask pattern is made and a suitable pixel conversion is performed.

In the present embodiment, a signal correction is carried out immediately after a disordered transport of the document is detected and the correction flag described above is turned ON. Image signals adjacent to a defective image data arising due to the disordered document transport, are received by the register array 33. The register array 33 produces, as described above, a pixel matrix pattern of pixels from the received adjacent image signals. Then, the decoder 34 makes a comparison of the thus produced pixel matrix pattern with a predetermined mask pattern, so that the adjacent image signals neighboring on a defective image data are corrected and a set of image signals containing corrected image data are outputted by the signal correction part 30. Such a signal correction performed by the signal correction part 30 includes: a) correcting the adjacent image signals, b) adding a new image signal or correcting an image signal, and c) a combination of the signal corrections described in the items a) and b) above.

Figure 7A:
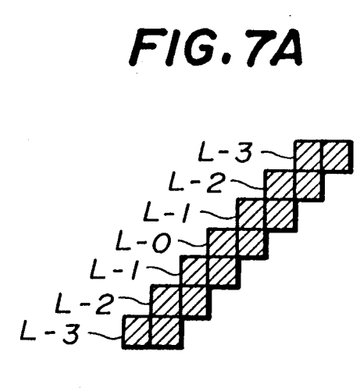
FIGS. 7A through 7C are diagrams for explaining an output image data which is supplied by the document scanning apparatus when excessive document transport takes place and a single line disappears from a reproduced image.
Figure 7B:
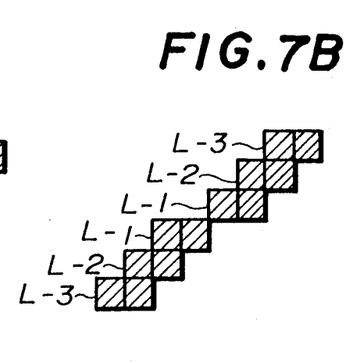
Figure 7C:
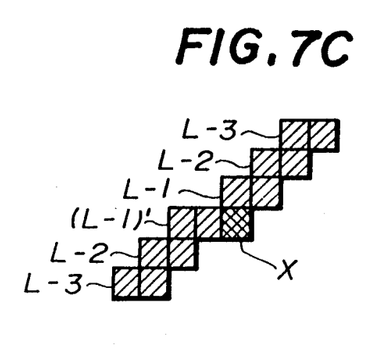

More specifically, a description will be given of a few examples of the above described signal correction procedures, with reference to FIGS. 7A through 7C. In this case, an image of an inclined line is reproduced from an original image of a document. FIG. 7A shows pixels representing an inclined line of the original image when the document is read by the document scanning apparatus with a proper transport of the document along the transport path. A suitably reproduced image shown in FIG. 7A is composed of lines (L+3) through (L−3). FIG. 7B shows pixels representing the inclined line when an excessive distance of document transport takes place. Among the pixels in such a case, only a line (L−0) disappears, due to the excessive document transport, when compared with those shown in FIG. 7B. The signal correction part 30 carries out a known signal correction such as anti-aliasing procedure after neighboring image signals indicating the lines (L−2), (L−1), (L+1), for example, are received. Among the pixels shown in FIG. 7C for example, a black pixel, indicated by a letter "X" in FIG. 7C, is added to the line (L+1) so that the pixels in the line (L+1) are changed to ones as in a line (L+1), shown in FIG. 7C. Or, when the distance of document transport is deficient and pixels representing one line are overlapped in a reproduced image, the known signal correction is carried out by the signal correction part 30 so that this line is deleted from the reproduced image.

Figures 8A, 8B, 8C:
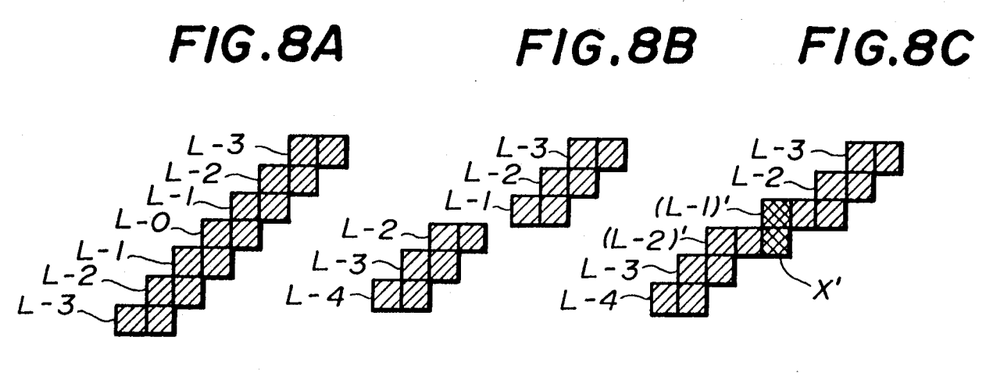
FIGS. 8A through 8C are diagrams for explaining an output image data which is supplied by the document scanning apparatus when excessive document transport takes place and a few lines disappear from a reproduced image.

FIGS. 8A through 8C show another example of the signal correction procedure performed by the signal correction part 30. FIG. 8A shows pixels representing an inclined line in the original image when image information is read from the document with a proper document transport along the transport path. A suitably reproduced image as shown in FIG. 8A is composed of plural lines (L+3) through (L−3). FIG. 8B shows pixels representing the inclined line when an excessive transport distance of the document takes place. In the pixels shown in FIG. 8B, two lines (L−0) and (L−1) disappear, due to the excessive document transport, when compared with those shown in FIG. 8A. In the present case, the signal correction part 30 carries out a signal correction by receiving, for example, neighboring image signals indicating the lines (L−2), (L−1), (L+2). In the pixels shown in FIG. 8C, for example, a black pixel as indicated by a letter "X'" in FIG. 8C, is added to each of the lines (L−1) and (L+2) so that the pixels in the lines (L−1), (L+2) are corrected to ones as lines (L−1)', (L+2), shown in FIG. 8C. Or, when the distance of document transport is deficient and pixels representing one or two lines are overlapped in a reproduced image, the known signal correction described above is carried out by the signal correction part 30 so that such lines are deleted from the reproduced image. In view of the detection accuracy of the sensors as well as the positional accuracy of the transport rollers, to make the reproduced image quality better, it is preferable that the above described signal correction be carried out by correcting two or three lines among original images.

As described in the foregoing, according to the present invention, it is possible to detect a position of the document in the transport path where the document transport is disordered, correct a defective image data due to the disordered document transport through prescribed signal processing of image signals adjacent to the defective image data, and supply image signals including the thus corrected image data to an image forming part. Thus, the document scanning apparatus according to the present invention ensures good quality of reproduced images which are supplied from the image forming part.

Further, the present invention is not limited to the above described embodiment, and variations and modifications may be made without departing from the scope of the present invention.

What is claimed is:

1. A document scanning apparatus comprising:
    image signal means for generating a number of successive image signals on the basis of image information read from a document which is transported along a transport path between a pair of feeding rollers and a pair of ejection rollers;
    first detection means for detecting a position of said document in the transport path where the transport of said document in the transport path is disordered when a front edge of said document being transported comes in contact with the pair of ejection rollers;
    second detection means for detecting a position of said document in the transport path where the transport of said document in the transport path is disordered when a rear edge of said document being transported separates from the pair of feeding rollers; and
    signal correction means for correcting a defective image signal when at least one of said first detection means and said second detection means detects the position of the document where the document transport is disordered, the defective image signal being corrected through a prescribed signal correction which is carried out for a number of image signals adjacent to the defective image signal which are received from said image signal means.

2. The apparatus as claimed in claim 1, wherein said signal correction means comprises a set of shift registers and a register array having a set of registers arranged in rows and columns, said set of registers and said set of shift registers receiving the number of adjacent image signals adjacent to the defective image signal from said image signal means.

3. The apparatus as claimed in claim 2, wherein said signal correction means comprises a decoder to which a number of adjacent image signals adjacent to the defective image signal are inputted, said decoder supplying a number of output image data with a corrected image data by comparing said number of adjacent image signals with a predetermined mask pattern.

4. The apparatus as claimed in claim 3, wherein said number of adjacent image signals received by said set of registers and said set of shift registers represent a matrix of pixels included in a reproduced image, said matrix of pixels having a prescribed matrix size.

5. The apparatus as claimed in claim 1, wherein said first detection means comprises a sensor provided in the transport path for sensing a front edge of said document, and a pulse counter in which a value corresponding to a predetermined distance is set, said value being repeatedly decremented each time a pulse is applied to a stepping motor of the feeding rollers until the resulting value in said pixel counter is equal to zero.

6. The apparatus as claimed in claim 5, wherein said predetermined distance corresponds with a distance between a location of said sensor and a location of said ejection rollers in the transport path.

7. The apparatus as claimed in claim 5, wherein said signal correction means comprises a flag which is turned on immediately after said first detection means detects said position of said document where the front edge of said document comes in contact with the ejection rollers, said signal correction means correcting said defective image signal when said flag is turned on.

8. The apparatus as claimed in claim 1, wherein said second detection means comprises a sensor provided in the transport path for sensing a rear edge of said document, and a pulse counter in which a value corresponding to a predetermined distance is set, said value being repeatedly decremented each time a pulse is applied to a stepping motor of the ejection rollers until the resulting value of said pulse counter is equal to zero.

9. The apparatus as claimed in claim 8, wherein said predetermined distance corresponds with a distance between a location of said sensor and a location of said feeding rollers in the transport path.

10. The apparatus as claimed in claim 8, wherein said signal correction means comprises a flag which is turned on immediately after said second detection means detects said position of said document where the rear edge of said document separates from the feeding rollers, said signal correction means correcting said defective image signal when said flag is turned on.

* * * * *